United States Patent
Sahoo et al.

(10) Patent No.: US 11,218,201 B2
(45) Date of Patent: Jan. 4, 2022

(54) METHOD AND APPARATUS FOR SENSOR BASED OPTIMAL ANTENNA ARRAY SWITCHING IN A WIRELESS COMMUNICATION SYSTEM

(71) Applicant: SAMSUNG ELECTRONICS CO., LTD., Suwon-si (KR)

(72) Inventors: Ashok Kumar Sahoo, Bangalore (IN); Ashok Kumar Reddy Chavva, Bangalore (IN); Sripada Kadambar, Bangalore (IN); Anusha Gunturu, Bangalore (IN); Shubham Khunteta, Bangalore (IN)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 0 days.

(21) Appl. No.: 17/185,292

(22) Filed: Feb. 25, 2021

(65) Prior Publication Data
US 2021/0266050 A1    Aug. 26, 2021

(30) Foreign Application Priority Data

Feb. 25, 2020 (IN) .............................. 202041008019
Feb. 15, 2021 (IN) .............................. 202041008019

(51) Int. Cl.
*H04B 7/06* (2006.01)
*H04B 17/327* (2015.01)
*H04B 17/345* (2015.01)

(52) U.S. Cl.
CPC ........... *H04B 7/0608* (2013.01); *H04B 7/063* (2013.01); *H04B 7/0623* (2013.01);
(Continued)

(58) Field of Classification Search
CPC .... H04B 7/0608; H04B 17/327; H04B 7/063; H04B 7/0623; H04B 7/0632; H04B 17/345
(Continued)

(56) References Cited

U.S. PATENT DOCUMENTS

| | | | |
|---|---|---|---|
| 6,628,235 B2 | 9/2003 | Wight | |
| 2014/0187187 A1* | 7/2014 | Alcocer Ochoa | .... H01Q 3/2611 455/278.1 |
| 2014/0327580 A1* | 11/2014 | Rautiainen | ................ G01S 5/02 342/385 |

FOREIGN PATENT DOCUMENTS

KR          10-2067114          1/2020

OTHER PUBLICATIONS

"Radio Resource Control (RRC) protocol specification, Release 15", 3GPP TS 38.331, NR, V15.0.0, Dec. 2017, 188 pages.
(Continued)

*Primary Examiner* — Fitwi Y Hailegiorgis
(74) *Attorney, Agent, or Firm* — Nixon & Vanderhye, P.C.

(57) ABSTRACT

The disclosure relates to 5G or pre-5G communication systems for supporting higher data transfer rates, following the 4G communication systems, such as LTE. The disclosure describes a method and a UE for sensor-based optimal antenna array switching in a wireless communication system. The method comprising: detecting at least one orientation parameter of the UE using one or more sensors of the UE, comparing a current signal strength parameter value of one or more serving Antenna Array Modules (AAMs) of the UE with a first threshold value or comparing a non-serving AAM monitor timer of the UE with a second threshold value, comparing at least one orientation parameter with a third threshold value based on the current signal strength parameter value of one or more serving AAMs being less
(Continued)

than the first threshold value or based on the non-serving AAM monitor timer exceeding the second threshold value, performing measurements on one or more non-serving AAMs, and selecting at least the one or more serving AAMs and the one or more non-serving AAMs based on the measurements performed.

20 Claims, 12 Drawing Sheets

(52) U.S. Cl.
CPC ......... *H04B 7/0632* (2013.01); *H04B 17/327* (2015.01); *H04B 17/345* (2015.01)

(58) Field of Classification Search
USPC ........................................................ 375/262
See application file for complete search history.

(56) References Cited

OTHER PUBLICATIONS

A.W. Doff, et al., "Sensor Assisted Movement Identification and Prediction for Beamformed 60 GHz Links: A Report", published Mar. 13, 2015, 8 pages.
Lei Gao, et al., "Evaluation of accelerometer based multi-sensor versus single-sensor activity recognition systems", Medical Engineering & Physics, vol. 36, 2014, pp. 779-785 (7 pages).
Jennifer R. Kwapisz, et al., "Activity Recognition using Cell Phone Accelerometers", SensorKDD, vol. 10, Jul. 25, 2010, 9 pages.
"Introducing capability of A-CSI-RS beam switching timing (H375)", R2-1812573, 3GPP TSG-RAN WG2 Meeting#103, Gothenburg, Sweden, Aug. 20-24, 2018, 5 pages.

\* cited by examiner

METHOD AND APPARATUS FOR SENSOR BASED OPTIMAL ANTENNA ARRAY SWITCHING IN A WIRELESS COMMUNICATION SYSTEM

CROSS-REFERENCE TO RELATED APPLICATIONS

This application is based on and claims priority under 35 U.S.C. § 119 to Indian Provisional Patent Application No. 202041008019, filed on Feb. 25, 2020, in the Indian Patent Office, and Indian Patent Application No. 202041008019, filed on Feb. 15, 2021, in the Indian Patent Office, the disclosures of which are incorporated by reference herein in their entireties.

BACKGROUND

Field

The disclosure relates to the field of telecommunication. For example, the disclosure relates to a method and a User Equipment (UE) for optimal antenna array switching in 5G New Radio (NR) system.

Description of Related Art

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a 5G NR UE, millimeter wave communication is achieved using beamforming technique, where a beam is formed by an application of appropriate phase excitation on the elements of a UE antenna array. Thus, the UE can switch between the beam configuration for transmission or reception by changing the phase excitation. This switching is a low overhead operation typically completed within a few microseconds. Further, the UE is typically equipped with multiple antenna arrays and has to choose and track the best antenna array to maximize the received signal power, which in turn maximizes data rate and responsiveness. However, the switching between antenna arrays, unlike beam switching, is a high overhead operation and takes up to 6 milliseconds depending on UE capability. Since, the 5G NR UE typically includes three or four antenna arrays, even a moderate periodicity of tracking of the best antenna array and its corresponding beam configuration using conventional methods can cause a peak throughput to drop up to 22%.

The disclosure addresses the aforesaid problem of antenna array switching.

The information disclosed in this background of the disclosure section is only for enhancement of understanding of the general background of the invention and should not be taken as an acknowledgement or any form of suggestion that this information forms the prior art already known to a person skilled in the art.

SUMMARY

Embodiments of the disclosure provide a method for optimal and/or improved antenna array switching for a User Equipment (UE).

According to various example embodiments a method for providing antenna array switching is provided, the method comprising: detecting at least one orientation parameter of the UE using one or more sensors of the UE, comparing a current signal strength parameter value of one or more serving Antenna Array Modules (AAMs) of the UE with a first threshold value or a non-serving AAM module monitor timer of the UE with a second threshold value and comparing the at least one orientation parameter with a third threshold value based on the current signal strength parameter value of one or more serving AAMs of the UE being less than the first threshold value or based on the non-serving AAM module monitor timer of the UE exceeding the second threshold value. The method may further comprise: performing measurements on one or more non-serving AAMs of the UE based on the at least one orientation parameter exceeding the third threshold value and selecting at least the one or more serving AAMs of the UE and the one or more non-serving AAMs of the UE based on the measurements performed on the one or more non-serving AAMs of the UE.

Embodiments of the disclosure may provide a User Equipment (UE) for optimal antenna array switching in a wireless communication system.

According to various example embodiments, a UE providing antenna array switching is provided, the UE comprising: a processor and a memory communicatively coupled to the processor, wherein the memory stores processor-executable instructions, which on execution, cause the processor to control the UE to: detect at least one orientation parameter of the UE using one or more sensors of the UE, compare a current signal strength parameter value of one or more serving Antenna Array Modules (AAMs) of the UE with a first threshold value or a non-serving AAM monitor timer of the UE with a second threshold value and compare the at least one orientation parameter with a third threshold value based on the current signal strength parameter value of one or more serving AAMs of the UE being less than the first threshold value or based on the non-serving AAM monitor timer of the UE exceeding the second threshold value. The instructions, when executed, may further cause the processor to control the UE to: perform measurements on one or more non-serving AAMs of the UE based on the at least one orientation parameter exceeding the third threshold value and select at least the one or more serving AAMs of the UE and the one or more non-serving AAMs of the UE based on the measurements performed on the one or more non-serving AAMs of the UE.

Embodiments of the disclosure may provide a method for optimal antenna array switching for a User Equipment (UE).

According to various example embodiments, a method of antenna array switching is provided, the method comprising: triggering measurements on one or more non-serving Antenna Array Modules (AAMs) of the UE by a trained Machine Learning (ML) model based on at least one of baseband parameters and orientation parameters of the UE using one or more sensors of the UE and generating a scheduling list of the one or more non-serving AAMs of the UE based on the at least one of the orientation parameter of the UE. The method may further comprise: performing measurements on one or more non-serving AAMs of the UE based on the generated scheduling list and selecting at least the one or more serving AAMs of the UE and the one or more non-serving AAMs of the UE based on the measurements performed on the one or more non-serving AAMs of the UE.

Embodiments of the disclosure may provide a User Equipment (UE) for optimal antenna array switching in a wireless communication system.

According to various example embodiments, a UE providing antenna array switching is provided, UE comprising: a processor and a memory communicatively coupled to the processor, wherein the memory stores processor-executable instructions, which on execution, cause the processor to control the UE to: trigger measurements on one or more non-serving Antenna Array Modules (AAMs) of the UE by a trained Machine Learning (ML) model based on at least one of baseband parameters and orientation parameters of the UE using one or more sensors of the UE and generate a scheduling list of the one or more non-serving AAMs of the UE based on the at least one of the orientation parameter of the UE. The instructions, when executed, may further cause the processor to control the UE to: perform measurements on one or more non-serving AAMs of the UE based on the generated scheduling list and select at least the one or more serving AAMs of the UE and the one or more non-serving AAMs of the UE based on the measurements performed on the one or more non-serving AAMs of the UE.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

Figure 1A:
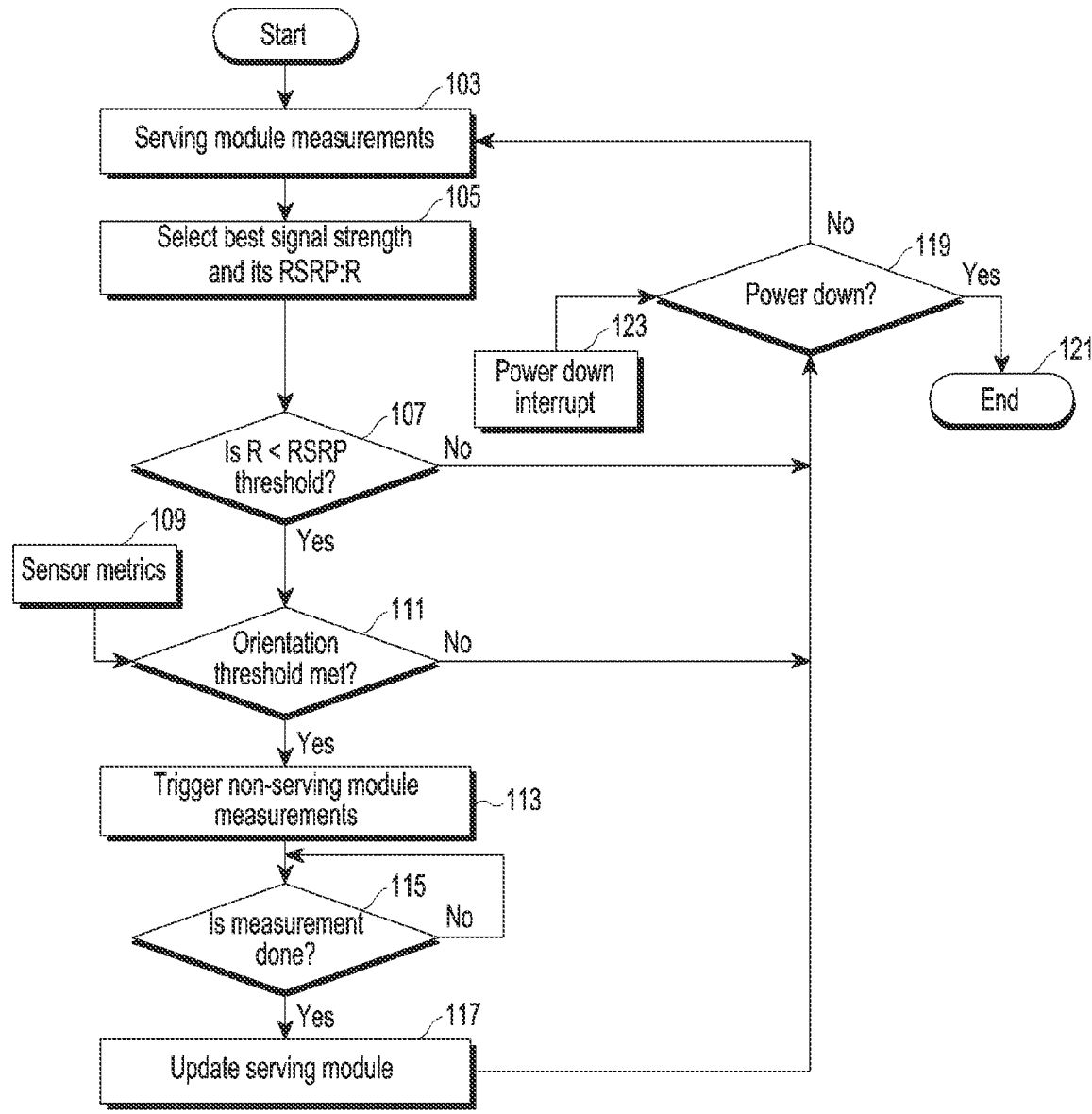
FIG. 1A is a flowchart illustrating example sensor-based optimal antenna array switching for a UE using a Reference Signal Received Power (RSRP) according to various embodiments.

It should be appreciated by those skilled in the art that any block diagrams herein represent conceptual views of illustrative systems embodying the principles of the present subject matter. Similarly, it will be appreciated that any flowcharts, flow diagrams, state transition diagrams, pseudo code, and the like represent various processes which may be substantially represented in a non-transitory computer readable medium and executed by a computer or processor, whether or not such computer or processor is explicitly shown.

DETAILED DESCRIPTION

In the disclosure, the word "exemplary" may be used herein to refer, for example, to "serving as an example, instance, or illustration." Any embodiment or implementation of the present subject matter described herein as "exemplary" is not necessarily to be construed as preferred or advantageous over other embodiments. Further, the term "optimal", as used herein, is interchangeable with and may refer to "optimal and/or improved".

While the disclosure is susceptible to various modifications and alternative forms, various example embodiments thereof are illustrated by way of example in the drawings and will be described in greater detail below. It should be understood, however that it is not intended to limit the disclosure to the particular forms disclosed, but on the contrary, the disclosure is intended to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description, reference may be made to the accompanying drawings that form a part hereof, and in which are shown by way of illustration various embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1A is a flowchart illustrating example sensor-based optimal antenna array switching for a UE using a Reference Signal Received Power (RSRP) according to various embodiments.

An example operation of sensor-based optimal antenna array switching for a 5G NR UE (hereafter, referred as UE) using a RSRP is explained with reference to FIG. 1A. At operation 103, the UE may perform measurement for signal strength using one or more serving Antenna Array Modules (AAMs) of the UE. The signal strength may be referred as current signal strength. At operation 105, the UE may select a best signal strength value among the measured signal strengths. The best signal strength value may be referred as current signal strength parameter value (R). At operation 107, the UE may compare the current signal strength parameter value (R) of one or more serving AAMs of the UE with an RSRP threshold value. The RSRP threshold value may be referred as a first threshold value. The first threshold value may be a pre-defined threshold value. On comparison at operation 107, if the current signal strength parameter value (R) of one or more serving AAMs of the UE is less than the first threshold value ("Yes" in operation 107), the UE may check for orientation threshold at operation 111. Prior to checking the orientation threshold, the UE may detect at least one orientation parameter of the UE using one or more sensors of the UE at operation 109. The one or more sensors of the UE may comprise, for example, and without limitation, one or more of an accelerometer, gyroscope, magnetometer, Time of Flight (ToF), grip sensor, or the like. The orientation parameter may include, for example, and without limitation, one or more of a change in orientation of the UE with respect to direction of base station (BS) signal arrival, a metric indicating total orientation change since last check, AAM blocked or unblocked status by the user grip, user activity status, a rate of device orientation change of the UE, acceleration of device orientation change of the UE, or the like. In an embodiment, the UE may perform operation 109 before operation 103. In an embodiment, the UE may perform operation 109 after operation 103. At operation 111, the UE may compare at least one orientation parameter with a third threshold value when the current signal strength parameter value of one or more serving AAMs of the UE is less than the first threshold value. The third threshold value may be a pre-defined threshold value. If the at least one orientation parameter exceeds the third threshold value ("Yes" in operation 111), the UE may perform measurements on one or more non-serving AAMs of the UE. For example, the UE may trigger measurements of the one or more non-serving AAMs of the UE at operation 113. At operation 115, the UE may check if the measurements of the one or more non-serving AAMs of the UE is completed. If the measurements of the one or more non-serving AAMs of the UE is not completed ("No" at operation 115), the UE may continue to perform the measurements of the one or more non-serving AAMs. However, if the measurements of the one or more non-serving AAMs of the UE is completed ("Yes" at operation 115), the UE may select or update at least the one or more serving AAMs of the UE and the one or more non-serving AAMs of the UE based on the measurements performed on the one or more non-serving AAMs of the UE at operation 117. Based on the measurement of non-serving AAMs, baseband parameters may be updated with measurements from the non-serving AAMs. Further, using a single or a combination of baseband parameters, at least the one or more serving AAMs of the UE and the one or more non-serving AAMs of the UE may be selected. For example, in case if K modules need to be selected as serving AAM among a total of N AAMs in the UE, and the selection is based on the measured RSRP values, then K modules with RSRP higher than the rest of (N-K) modules are marked as serving AAM and the rest (N-K) are marked as non-serving AAM. The baseband parameters may comprise, for example, beam RSRP, Doppler frequency shift and Power Delay Profile (PDP) and beam gain patterns. At operation 119, the UE may check if there is battery power to continue UE operation. If the UE has battery power to continue ("No" in operation 119), the UE may return to operation 103 and continue operating with the at least the one or more serving AAMs of the UE and the one or more non-serving AAMs of the UE selected or updated at operation 117. However, if the UE does not have sufficient battery power to continue operating ("Yes" at operation 119), the UE may stop operating at operation 121. At any stage during the sensor-based optimal antenna array switching for the 5G NR UE using the RSRP, if there is a power down interrupt, for instance, an interrupt received from an external source for UE power down or UE switching from 5G to 4G at operation 123, the UE in such situations may stop operating at operation 121.

At operation 107, if the current signal strength parameter value (R) of one or more serving AAMs of the UE is not less than the first threshold value ("No" at operation 107), the UE may go to operation 119 to check if there is battery power to continue UE operation.

At operation 111, if the at least one orientation parameter do not exceed the third threshold value ("No" at operation 111), the UE may go to operation 119 to check if there is battery power to continue UE operation.

Figure 1B:
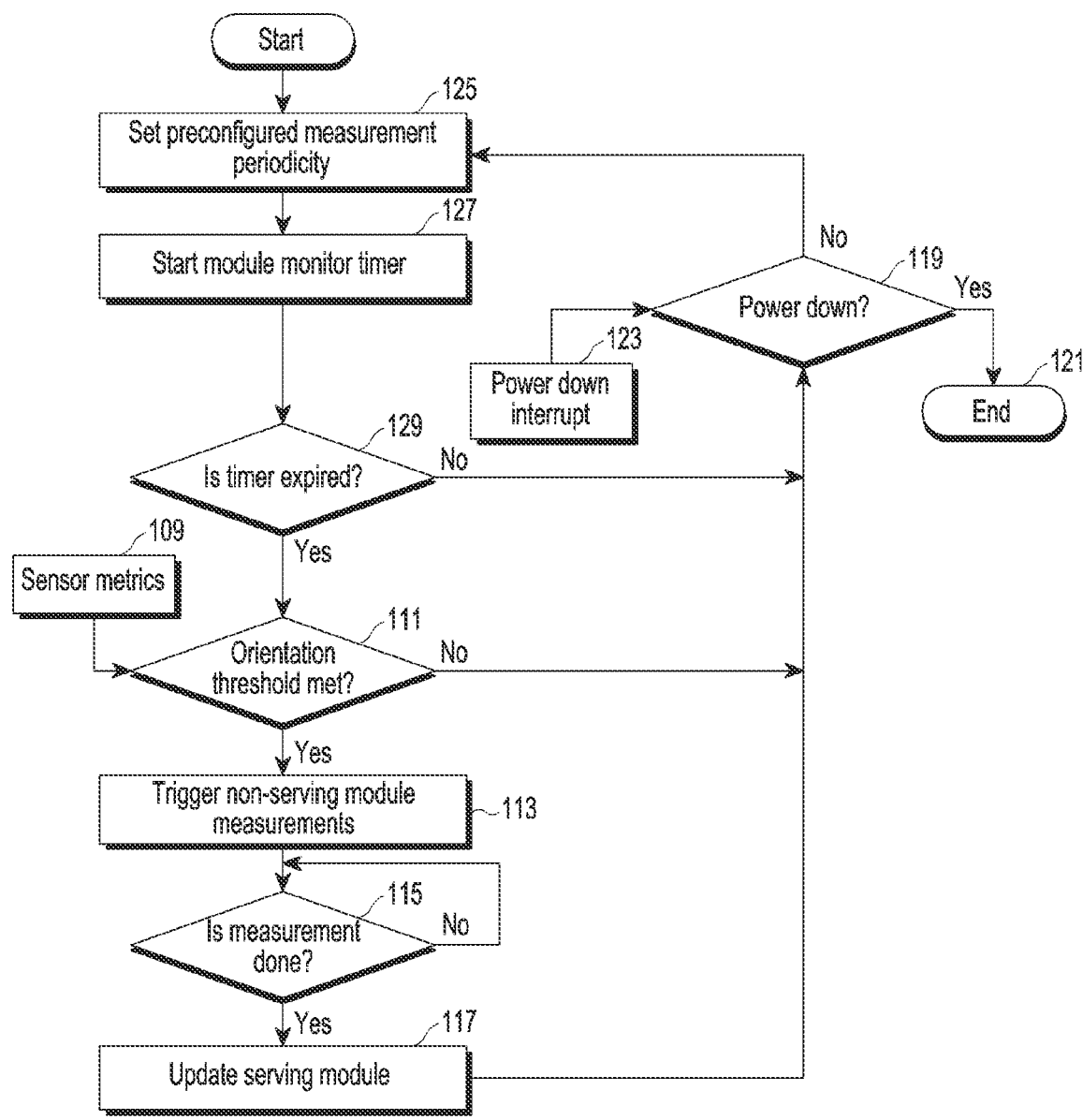
FIG. 1B is a flowchart illustrating example sensor-based optimal antenna array switching for a UE using a timer according to various embodiments.

FIG. 1B is a flowchart illustrating example sensor-based optimal antenna array switching for a UE using a timer according to various embodiments.

An example operation of sensor-based optimal antenna array switching for a 5G NR UE (hereinafter, referred as UE) using a timer is explained with reference to FIG. 1B. At operation 125, the UE may set a pre-configured measurement periodicity. The pre-configured measurement periodicity may be the periodicity with which measurement of non-serving AAMs may be triggered. It may be the same as the timer's time limit. For example, if the periodicity is 20 milliseconds then the timer will expire in every 20 milliseconds. At operation 127, the UE may start a timer within the UE. The timer may be referred to as a non-serving AAM module monitor timer. At operation 129, the UE may compare the non-serving AAM module monitor timer of the UE with a time limit of the non-serving AAM module monitor timer. The time limit or timer value of the non-serving AAM module monitor timer may be referred to as a second threshold value. The second threshold value may be a pre-defined time limit. On comparison at operation 129, if the timer of the UE exceeds the second threshold value e.g., timer has expired ("Yes" at operation 129), the UE may check for orientation threshold at operation 111. Prior to checking the orientation threshold, the UE may detect at least one orientation parameter of the UE using one or more sensors of the UE at operation 109. The one or more sensors of the UE may include, for example, and without limitation, at least one of an accelerometer, gyroscope, magnetometer, Time of Flight (ToF), grip sensor, or the like. The orientation parameter may include, for example, and without limitation, a change in orientation of the UE with respect to direction of base station (BS) signal arrival, a metric indicating total orientation change since last check, AAM blocked or unblocked status by the user grip, user activity status, a rate of device orientation change of the UE, acceleration of device orientation change of the UE, or the like. In an embodiment, the UE may perform operation 109 before operation 125. In an embodiment, the UE may perform operation 109 after operation 125. At operation 111, the UE may compare at least one orientation parameter with a third threshold value when the non-serving AAM module monitor timer of the UE exceeds the second threshold value. The third threshold value may be a pre-defined threshold value. If the at least one orientation parameter exceeds the third threshold value ("Yes" at operation 111), the UE may perform measurements on one or more non-serving AAMs of the UE. For example, the UE may trigger measurements of the one or more non-serving AAMs of the UE at operation 113. At operation 115, the UE may check if the measurements of the one or more non-serving AAMs of the UE is completed. If the measurements of the one or more non-serving AAMs of the UE is not completed ("No" at operation 115), the UE may continue to perform the measurements of the one or more non-serving AAMs. However, if the measurements of the one or more non-serving AAMs of the UE is completed ("Yes" at operation 115), the UE may select or update at least the one or more serving AAMs of the UE and the one or more non-serving AAMs of the UE based on the measurements performed on the one or more non-serving AAMs of the UE at operation 117. After the measurement of non-serving AAMs, baseband parameters may be updated with measurements from the non-serving AAMs. Further, using a single or a combination of baseband parameters, at least the one or more serving AAMs of the UE and the one or more non-serving AAMs of the UE may be selected. For example, in case if K modules need to be selected as serving AAM among a total of N AAMs in the UE, and the selection is based on the measured RSRP values, then K modules with RSRP higher than the rest of (N-K) modules are marked as serving AAM and the rest (N-K) are marked as non-serving AAM. The baseband parameters may comprise, for example, beam RSRP, Doppler frequency shift and Power Delay Profile (PDP) and beam gain patterns. At operation 119, the UE may check if there is battery power to continue UE operation. If the UE has battery power to continue ("No" at operation 119), the UE may return to operation 103 and continue operating with the at least the one or more serving AAMs of the UE and the one or more non-serving AAMs of the UE selected or updated at operation 117. However, if the UE does not have sufficient battery power to continue operating ("Yes" at operation 119), the UE may stop operating at operation 121. At any stage during the sensor-based optimal antenna array switching for the 5G NR UE using the timer, if there is a power down interrupt, for instance, an interrupt received from an external source for UE power down or UE switching from 5G to 4G at operation 123, the UE in such situations may stop operating at operation 121.

At operation 129, if the timer of the UE has not exceeded the second threshold value e.g., timer has not expired ("No" at operation 129), the UE may go to operation 119 to check if there is battery power to continue UE operation.

At operation 111, if the at least one orientation parameter do not exceed the third threshold value ("No" at operation 111), the UE may go to operation 119 to check if there is battery power to continue UE operation.

Figure 2A:
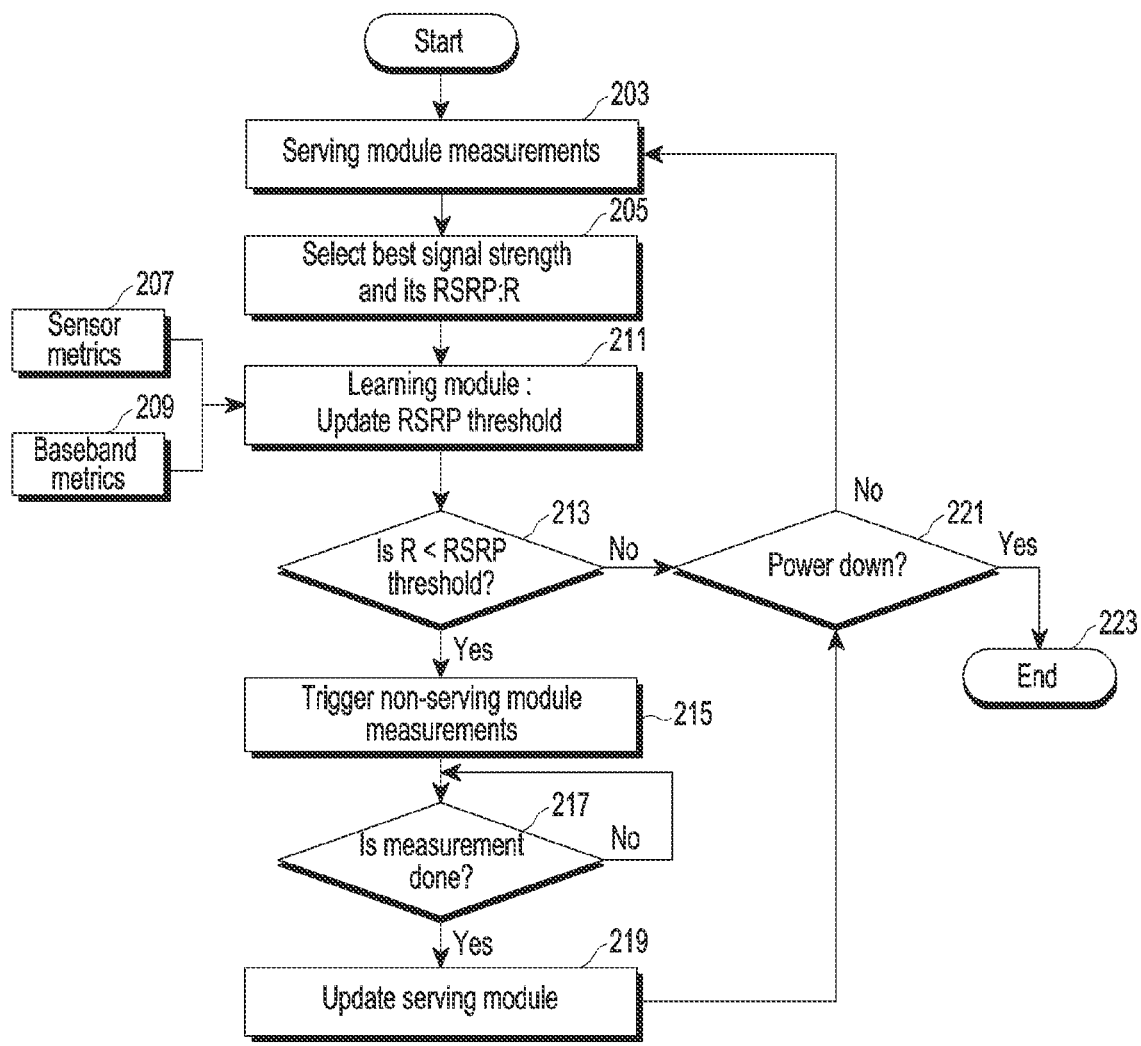
FIG. 2A is a flowchart illustrating example sensor-based optimal antenna array switching for a UE using a Machine Learning (ML) based RSRP according to various embodiments.

FIG. 2A is a flowchart illustrating example sensor-based optimal antenna array switching for a using a Machine Learning (ML) based RSRP according to various embodiments.

An example operation of sensor-based optimal antenna array switching for a 5G NR UE (hereafter, referred as UE) using a ML based RSRP is explained with reference to FIG. 2A. At operation 203, the UE may perform measurement for signal strength using one or more serving Antenna Array Modules (AAMs) of the UE. The signal strength may be referred as current signal strength. At operation 205, the UE may select best signal strength value among the measured signal strengths. The best signal strength value may be referred as current signal strength parameter value (R). At operation 211, a learning module of the UE may update a RSRP threshold value. The RSRP threshold value may be referred as a first threshold value. The learning module may be a trained ML module. The trained ML module used for this purpose may include, but is not limited to, Random Forest method, Support Vector Machines (SVM) model, Deep Neural Networks (DNN) model, Convolutional Neural Network (CNN) model, a Reinforcement Learning (RL) model, or the like. The RSRP threshold value may be based on at least one of historic baseband parameters (also, referred as baseband metrics 209) and at least one historic orientation parameter (also, referred as sensor metrics 207) of the UE. The term 'historic' may refer, for example, to measurements performed in past, which may be saved in a memory of the UE. The historic baseband parameters may include, for example, and without limitation, beam Reference Signal Received Power (RSRP), Doppler frequency shift and Power Delay Profile (PDP), beam gain patterns, or the like. The historic orientation parameter may include, for example, and without limitation, a change in orientation of the UE with respect to direction of base station (BS) signal arrival, a metric indicating total orientation change since last check, AAM blocked or unblocked status by the user grip, user activity status, a rate of device orientation change of the UE, acceleration of device orientation change of the UE, or the like. The historic orientation parameters may be detected by the UE using one or more sensors of the UE. The one or more sensors of the UE may include, for example, and without limitation, an accelerometer, gyroscope, magnetometer, Time of Flight (ToF), grip sensor, or the like. In an embodiment, the UE may perform operation 211 before operation 203 as a first operation. At operation 213, the UE may compare the current signal strength parameter value (R) of one or more serving AAMs of the UE with the RSRP threshold value. On comparison at operation 213, if the current signal strength parameter value (R) of one or more serving AAMs of the UE is less than the first threshold value ("Yes" at operation 213), the UE may perform measurements on one or more non-serving AAMs of the UE. For example, the UE may trigger measurements of the one or more non-serving AAMs of the UE at operation 215. At operation 217, the UE may check if the measurements of the one or more non-serving AAMs of the UE is completed. If the measurements of the one or more non-serving AAMs of the UE is not completed ("No" at operation 217), the UE may continue to perform the measurements of the one or more non-serving AAMs. However, if the measurements of the one or more non-serving AAMs of the UE is completed ("Yes" at operation 217), the UE may select or update at least the one or more serving AAMs of the UE and the one or more non-serving AAMs of the UE based on the measurements performed on the one or more non-serving AAMs of the UE at operation 219. After the measurement of non-serving AAMs, historic baseband parameters may be updated with measurements from the non-serving AAMs. Further, using a single or a combination of updated baseband parameters, at least the one or more serving AAMs of the UE and the one or more non-serving AAMs of the UE may be selected. For example, in case if K modules need to be selected as serving AAM among a total of N AAMs in the UE, and the selection is based on the measured RSRP values, then K modules with RSRP higher than the rest of (N-K) modules are marked as serving AAM and the rest (N-K) are marked as non-serving AAM. At operation 221, the UE may check if there is battery power to continue UE operation. If the UE has battery power to continue ("No" at operation 221), the UE may return to operation 203 and continue operating with the at least the one or more serving AAMs of the UE and the one or more non-serving AAMs of the UE selected or updated at operation 219. However, if the UE does not have sufficient battery power to continue operating ("Yes" at operation 221), the UE may stop operating at operation 223.

At operation 213, if the current signal strength parameter value (R) of one or more serving AAMs of the UE is not less than the first threshold value ("No" at operation 213), the UE may go to operation 221 to check if there is battery power to continue UE operation.

In an embodiment, at operation 215, when the UE triggers measurements of the one or more non-serving AAMs of the UE, the UE may generate a scheduling list of the one or more non-serving AAMs of the UE based on the at least one of the orientation parameter of the UE and subsequently, the UE may perform measurements on one or more non-serving AAMs of the UE based on the generated scheduling list. After operation 215, the UE may continue with operation 217. The scheduling list may be a list of non-serving AAMs which may be measured. For example, if the UE has four AAMs in total (AAM1, AAM2, AAM3 and AAM4), and AAM1 is the serving AAM, then the UE may generate a scheduling list which contains AAM2 and AAM3 for measurement.

Figure 2B:
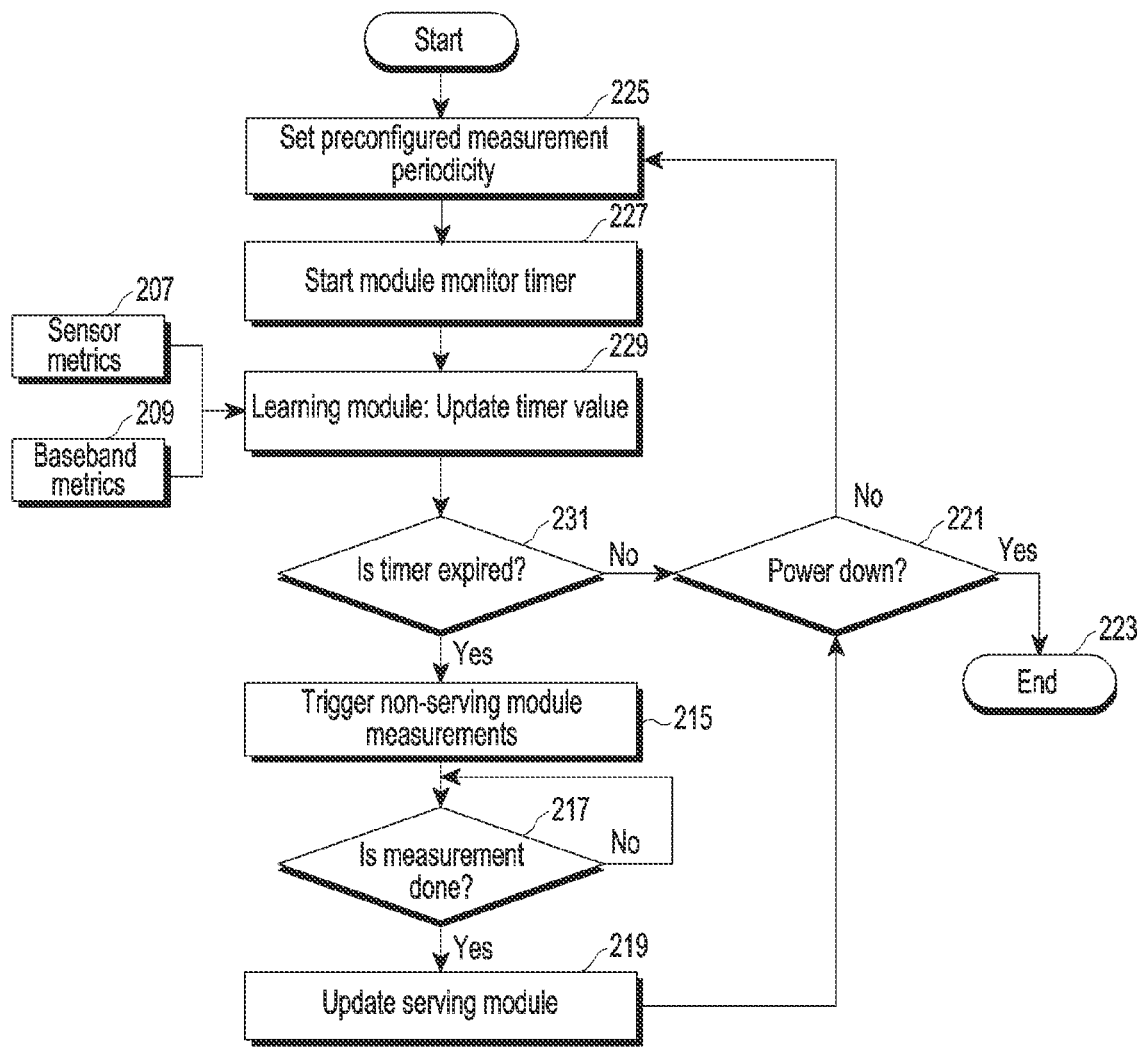
FIG. 2B is a flowchart illustrating example sensor-based optimal antenna array switching for a UE using a ML based timer according to various embodiments.

FIG. 2B is a flowchart illustrating example sensor-based optimal antenna array switching for a UE using a ML based timer according to various embodiments.

An example operation of sensor-based optimal antenna array switching for a 5G NR UE (hereafter, referred as UE) using a ML based timer is explained with reference to FIG. 2B. At operation 225, the UE may set a pre-configured measurement periodicity. In an embodiment, the pre-configured measurement periodicity may be updated by a learning module to increase or decrease the frequency of non-serving AAM module measurements. For instance, the learning module may disable the non-serving AAM module measurements by setting the period to infinity. At operation 227, the UE may start a timer within the UE. The timer may be referred as a non-serving AAM module monitor timer. The time limit or timer value of the non-serving AAM module monitor timer may be referred as a second threshold value. At operation 229, the learning module of the UE may update the timer value. The learning module may be a trained ML module. The trained ML module used for this purpose may include, for example, and without limitation, a Random Forest method, Support Vector Machines (SVM) model, Deep Neural Networks (DNN) model, Convolutional Neural Network (CNN) model, a Reinforcement Learning (RL) model, or the like. The timer value may be based on at least one of historic baseband parameters (also, referred as baseband metrics 209) and at least one historic orientation parameter (also, referred as sensor metrics 207) of the UE. The term 'historic' may refer, for example, to measurements performed in past, which may be saved in a memory of the UE. The historic baseband parameters may include, for example, and without limitation, beam Reference Signal Received Power (RSRP), Doppler frequency shift and Power Delay Profile (PDP), beam gain patterns, or the like. The historic orientation parameter may include, for example, and without limitation, a change in orientation of the UE with respect to direction of base station (BS) signal arrival, a metric indicating total orientation change since last check, AAM blocked or unblocked status by the user grip, user activity status, a rate of device orientation change of the UE, acceleration of device orientation change of the UE, or the like. The historic orientation parameters may be detected by the UE using one or more sensors of the UE. The one or more sensors of the UE may include, for example, and without limitation, an accelerometer, gyroscope, magnetometer, Time of Flight (ToF), grip sensor, or the like. In an embodiment, the UE may perform operation 229 before operation 225 as a first operation. At operation 231, the UE may compare the non-serving AAM module monitor timer of the UE with the time limit of the non-serving AAM module monitor timer. On comparison at operation 231, if the non-serving AAM module monitor timer of the UE exceeds the time limit of the non-serving AAM module monitor timer ("Yes" at operation 231), the UE may perform measurements on one or more non-serving AAMs of the UE. For example, the UE may trigger measurements of the one or more non-serving AAMs of the UE at operation 215. At operation 217, the UE may check if the measurements of the one or more non-serving AAMs of the UE is completed. If the measurements of the one or more non-serving AAMs of the UE is not completed ("No" at operation 217), the UE may continue to perform the measurements of the one or more non-serving AAMs. However, if the measurements of the one or more non-serving AAMs of the UE is completed ("Yes" at operation 217), the UE may select or update at least the one or more serving AAMs of the UE and the one or more non-serving AAMs of the UE based on the measurements performed on the one or more non-serving AAMs of the UE at operation 219. After the measurement of non-serving AAMs, historic baseband parameters may be updated with measurements from the non-serving AAMs. Further, using a single or a combination of updated baseband parameters, at least the one or more serving AAMs of the UE and the one or more non-serving AAMs of the UE may be selected. For example, in case if K modules need to be selected as serving AAM among a total of N AAMs in the UE, and the selection is based on the measured RSRP values, then K modules with RSRP higher than the rest of (N-K) modules are marked as serving AAM and the rest (N-K) are marked as non-serving AAM. At operation 221, the UE may check if there is battery power to continue UE operation. If the UE has battery power to continue ("No" at operation 221), the UE may return to operation 225 and continue operating with the at least the one or more serving AAMs of the UE and the one or more non-serving AAMs of the UE selected or updated at operation 219. However, if the UE does not have sufficient battery power to continue operating ("Yes" at operation 221), the UE may stop operating at operation 223.

At operation 231, if the non-serving AAM module monitor timer of the UE does not exceed the time limit of the non-serving AAM module monitor timer ("No" in operation 231), the UE may go to operation 221 to check if there is battery power to continue UE operation.

In an embodiment, at operation 215, when the UE triggers measurements of the one or more non-serving AAMs of the UE, the UE may generate a scheduling list of the one or more non-serving AAMs of the UE based on the at least one of the orientation parameter of the UE and subsequently, the UE may perform measurements on one or more non-serving AAMs of the UE based on the generated scheduling list. After operation 215, the UE may continue with operation 217. The scheduling list may be a list of non-serving AAMs which may be measured. For example, if the UE has four AAMs in total (AAM1, AAM2, AAM3 and AAM4), and AAM1 is the serving AAM, then the UE may generate a scheduling list which contains AAM2 and AAM3 for measurement.

Figure 2C:
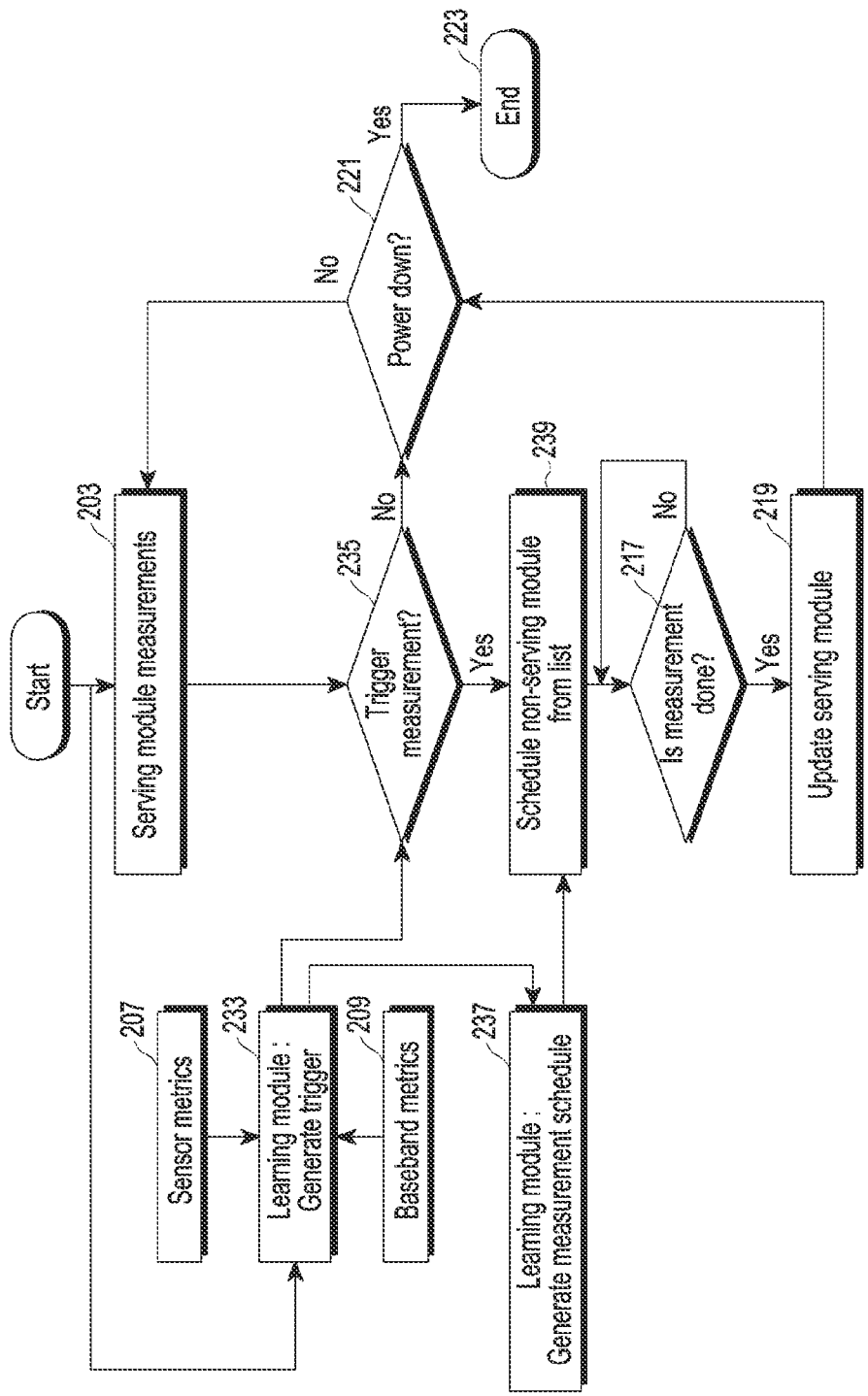
FIG. 2C is a flowchart illustrating example sensor-based optimal antenna array switching for a UE using a ML based triggering according to various embodiments.

FIG. 2C is a flowchart illustrating example sensor-based optimal antenna array switching for a UE using a ML based triggering according to various embodiments.

An example operation of sensor-based optimal antenna array switching for a 5G NR UE (hereinafter, referred as UE) using a ML based triggering is explained with reference to FIG. 2C. At operation 203, the UE may perform measurement for signal strength using one or more serving AAMs of the UE. The signal strength may be referred to as current signal strength. At the same time, the learning module may receive measured signal strength to generate a trigger at operation 233. The learning module may be a trained ML module. The trained ML module used for this purpose may include, for example, and without limitation, Random Forest method, Support Vector Machines (SVM) model, Deep Neural Networks (DNN) model, Convolutional Neural Network (CNN) model, a Reinforcement Learning (RL) model or the like. Also, at operation 233, the learning module may receive at least one of historic baseband parameters (also, referred as baseband metrics 209) and at least one historic orientation parameter (also, referred as sensor metrics 207) of the UE. The term 'historic' may refer, for example, to measurements performed in past, which may be saved in a memory of the UE. The historic baseband parameters may include, for example, and without limitation, beam Reference Signal Received Power (RSRP), Doppler frequency shift and Power Delay Profile (PDP), beam gain patterns, or the like. The historic orientation parameter may include, for example, and without limitation, a change in orientation of the UE with respect to direction of base station (BS) signal arrival, a metric indicating total orientation change since last check, AAA blocked or unblocked status by the user grip, user activity status, a rate of device orientation change of the UE, acceleration of device orientation change of the UE, or the like. The historic orientation parameters may be detected by the UE using one or more sensors of the UE. The one or more sensors of the UE may include, for example, and without limitation, at least one of, an accelerometer, gyroscope, magnetometer, Time of Flight (ToF), grip sensor, or the like. Also, at operation 233, the learning module may generate trigger to measure one or more non-serving AAMs based on the measured signal strength and at least one the baseband metrics 209 and the sensor metrics 207. At operation 237, when the learning module triggers measurements of the one or more non-serving AAMs, the UE may generate a scheduling list of the one or more non-serving AAMs based on the at least one of the orientation parameters of the UE and subsequently, may schedule the one or more non-serving AAMs from the scheduling list for measurements at operation 239. The scheduling list may be a list of non-serving AAMs which may be measured. For example, if the UE has four AAMs in total (AAM1, AAM2, AAM3 and AAM4), and AAM1 is the serving AAM, then the UE may generate a scheduling list which contains AAM2 and AAM3 for measurement. The UE may perform measurements on one or more non-serving AAMs of the UE based on the generated scheduling list at operation 237. At operation 217, the UE may check if the measurements of the one or more non-serving AAMs of the UE is completed. If the measurements of the one or more non-serving AAMs of the UE is not completed ("No" at operation 217), the UE may continue to perform the measurements of the one or more non-serving AAMs. However, if the measurements of the one or more non-serving AAMs of the UE is completed ("Yes" at operation 217), the UE may select or update at least the one or more serving AAMs of the UE and the one or more non-serving AAMs of the UE based on the measurements performed on the one or more non-serving AAMs of the UE at operation 219. After the measurement of non-serving AAMs, historic baseband parameters may be updated with measurements from the non-serving AAMs. Further, using a single or a combination of updated baseband parameters, at least the one or more serving AAMs of the UE and the one or more non-serving AAMs of the UE may be selected. For example, in case if K modules need to be selected as serving AAM among a total of N AAMs in the UE, and the selection is based on the measured RSRP values, then K modules with RSRP higher than the rest of (N-K) modules are marked as serving AAM and the rest (N-K) are marked as non-serving AAM. At operation 221, the UE may check if there is battery power to continue UE operation. If the UE has battery power to continue ("No" at operation 221), the UE may return to operation 203 and continue operating with the at least the one or more serving AAMs of the UE and the one or more non-serving AAMs of the UE selected or updated at step 219. However, if the UE does not have sufficient battery power to continue operating ("Yes" at operation 221), the UE may stop operating at operation 223.

At operation 235, if there was no trigger generated for the measurements of the one or more non-serving AAMs ("No" in operation 235), the UE may go to operation 221 to check if there is battery power to continue UE operation.

Figure 3:
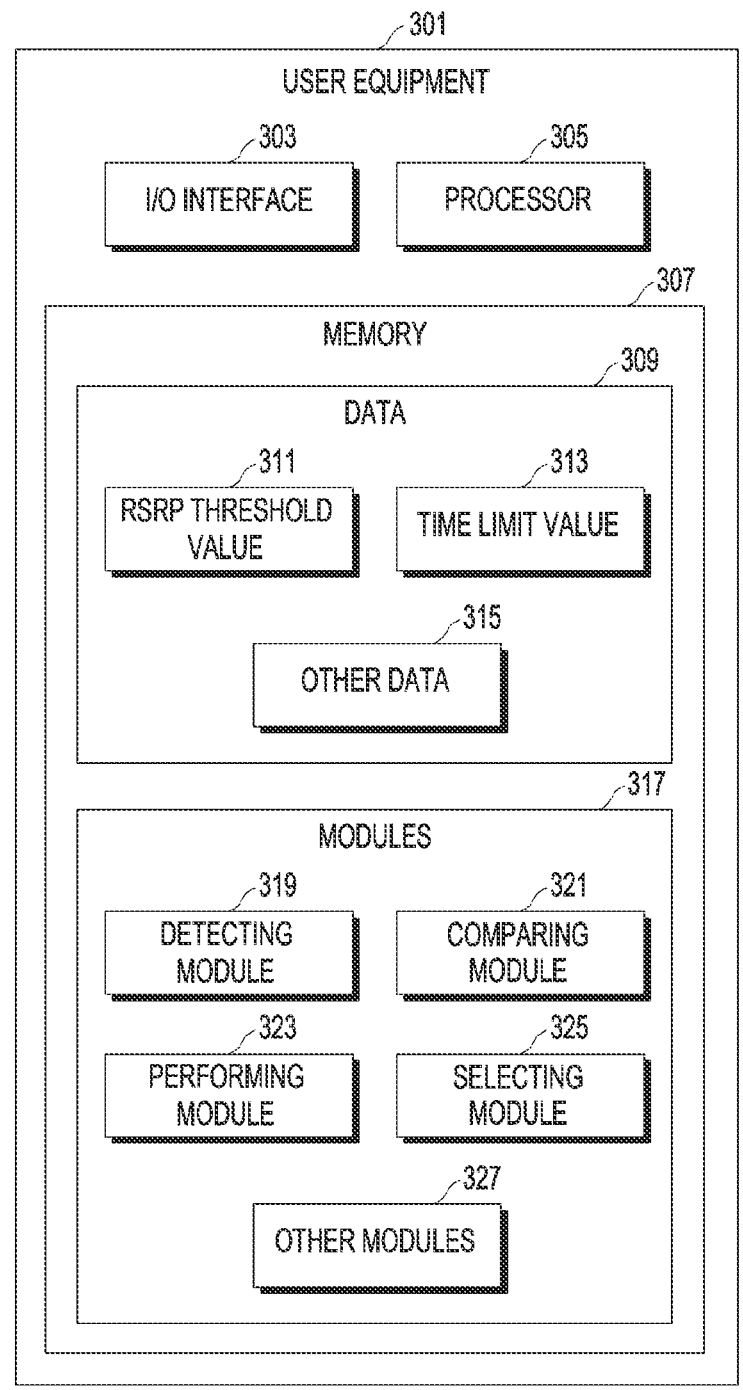
FIG. 3 is a block diagram illustrating an example UE according to various embodiments.

FIG. 3 is a block diagram illustrating an example UE according to various embodiments.

The UE 301 may include I/O interface (e.g., including interface circuitry) 303, processor (e.g., including processing circuitry) 305, data 309 in a memory 307 and one or more modules (e.g., including various circuitry) 317, which are described below in greater detail.

The UE 301 may receive inputs from one or more sensors of the UE 301 or/and at least one of the orientation parameter of the UE 301 via the I/O interface 303.

The processor 305 may include various processing circuitry, including, for example, and without limitation, at least one data processor for optimal antenna array switching for the UE 301. The processor 303 may include specialized processing units such as integrated system (bus) controllers, memory management control units, floating point units, graphics processing units, digital signal processing units, etc.

In an embodiment, the data 309 may be stored within the memory 307. The memory 307 may be communicatively coupled to the processor 305 of the UE 301. The memory 307 may, also, store processor instructions which may cause the processor 305 to execute the instructions for optimal antenna array switching for UE 301. The memory 307 may include, without limitation, memory drives, etc. The memory drives may further include a drum, magnetic disc drive, magneto-optical drive, optical drive, Redundant Array of Independent Discs (RAID), solid-state memory devices, solid-state drives, etc. The data 309 may include, for example, RSRP threshold value 311, time limit value 313 and other data 315. In an embodiment, the data 309 may include third threshold value (not shown in FIG. 3) to store a third threshold value or a pre-defined threshold value.

The RSRP threshold value 311 may, for example, store the first threshold value.

The time limit value 313 may, for example, store the second threshold value.

The other data 315 may store data, including, for example, temporary data and temporary files, generated by one or more modules 317 for performing the various functions of the UE 301.

In an embodiment, the data 309 in the memory 307 may be processed by the one or more modules 317 present within the memory 307 of the UE 301. The one or more modules 317 may be implemented as dedicated hardware units. As used herein, the term module may refer, for example, to an Application Specific Integrated Circuit (ASIC), an electronic circuit, a Field-Programmable Gate Arrays (FPGA), a combinational logic circuit, and/or other suitable components that provide the described functionality. In some implementations, the one or more modules 317 may be communicatively coupled to the processor 305 for performing one or more functions of the UE 301. The said modules 317 when configured with the functionality defined in the present disclosure will result in a novel hardware.

In an implementation, the one or more modules 317 may include, but are not limited to, a detecting module 319, a comparing module 321, a performing module 323 and a selecting module 325. The one or more modules 317 may, also, include other modules 327 to perform various miscellaneous functionalities of the UE 301. In an embodiment, the one or more modules 317 may, also, include a learning module (not shown in FIG. 3). The learning module may be a trained ML module. The trained ML module used for this purpose may be, but not limited to, Random Forest method, Support Vector Machines (SVM) model, Deep Neural Networks (DNN) model, Convolutional Neural Network (CNN) model or a Reinforcement Learning (RL) model.

The detecting module 319 may detect at least one orientation parameter of the UE 301 using one or more sensors of the UE 301. The one or more sensors of the UE 301 may include, for example, and without limitation, accelerometer, gyroscope, magnetometer, Time of Flight (ToF) and grip sensor. The orientation parameter may comprise a change in orientation of the UE 301 with respect to direction of base station (BS) signal arrival, a metric indicating total orientation change since last check, a rate of device orientation change of the UE 301 and acceleration of device orientation change of the UE 301.

The rate of device orientation change of the UE 301 and acceleration of device orientation change of the UE 301 may be detected using one or more sensors of the UE 301 involving, for example, two factors: (1) tracking Angle of Arrival (AoA) of a base station signal and (2) tracking device orientation using the one or more sensors of the UE 301. Using the one or more sensors of the UE 301 and sensor fusion algorithms, the UE 301 may be capable of estimating its orientation in 3D polar coordinates ($\theta$, $\phi$). The UE 301 may, also, estimate the angle of arrival ($P_{AoA}$) i.e., direction of strongest signal reception. Useful metrics for Antenna Array Module (AAM) switching may be of the form $f_r(P_{AoA}, \theta, \phi)$. Once parameters such as $P_{AoA}$, $\theta$ and $\phi$ values are known, time rate of change of device orientation may be computed i.e., $d(P_{AoA})/dt$, $d(\theta)/dt$ and $d(\phi)/dt$ and corresponding $d^2(P_{AoA})/dt^2$, $d^2(\theta)/dt^2$ and $d^2(\phi)/dt^2$. Here, $d\theta/dt$ may be referred as rate of change of zenith, $d\phi/dt$ may be referred as rate of change of azimuth, $d^2\theta/dt^2$ may be referred as acceleration of change of zenith, and $d^2\phi/dt^2$ may be referred as acceleration of change of azimuth.

The metric indicating total orientation change may be detected using one or more sensors of the UE 301 in the following illustrative way: one or more points $P_m$ in coordinate space may be identified for each AAM with respect to its dominant beam gain directions. The metrics for module switching using distance are of the form $d_m = f_{md}(P_{AoA}, \theta, \phi)$ where $d_m$ may denote an equivalent distance metric of module m with respect to dominant angle of arrival $P_{AoA}$. For instance, the module m with least $d_m$ has higher probability of being the serving module.

$$d_m = \Sigma_{p=1}^{P} |x_m^P - x^{PAoA}|^2 + |y_m^P - y^{PAoA}|^2 + |z_m^P - z^{PAoA}|^2$$

Rate of change metric with respect to time of $d_m$ may serve as a useful parameter for serving AAM change.

The beam gain pattern may be detected using one or more sensors of the UE 301 in the following way: one or more points $P_m$ in coordinate space may be identified for each AAM with respect to its dominant beam gain directions. For each point $P_m$ of an AAM, a beam gain may be computed corresponding to $b_m = f_{mb}(P_{AoA}, \theta, \phi)$. Given the angle of arrival $P_{AoA} = (\theta^{AoA}, \phi^{AoA})$ in polar, beam pattern function $g_p$ of the module for each point $p \in P$, $b_m$ may be computed as follows:

$$b_m = \Sigma_p^P g_p(\theta^{AoA} - \theta_p, \phi^{AoA} - \phi^p)$$

Here, $b_m$ may be expected to be high when $p_m$ is close to $P_{AoA}$ for serving AAM and may fall off rapidly otherwise. Time rate of change metric of $b_m$ may serve as a useful parameter for serving AAM change.

Blockage information may be useful in scheduling the non-serving AAMs and its beams. For example, when the UE 301 is lying flat on its back, it may be redundant to scan the non-serving AAMs beams in the corresponding direction due to the large path loss. The blockage information may be estimated using Time of Flight (ToF) sensor.

The comparing module 321 may perform multiple actions. At first, the comparing module 321 may compare current signal strength parameter value of one or more serving Antenna Array Modules (AAMs) of the UE 301 with the first threshold value or non-serving AAM module monitor timer of the UE 301 with the second threshold value. The second threshold value may be a time limit of the non-serving AAM module monitor timer. In an embodiment, the first threshold value and the second threshold value may be based on at least one of historic baseband parameters and at least one historic orientation parameter of the UE 301. The historic baseband parameters may comprise beam Reference Signal Received Power (RSRP), Doppler frequency shift and Power Delay Profile (PDP) and beam gain patterns whereas the historic orientation parameter may comprise a change in orientation of the UE 301 with respect to direction of base station (BS) signal arrival, a metric indicating total orientation change since last check, AAM blocked or unblocked status by the user grip, user activity status, a rate of device orientation change of the UE 301 and acceleration of device orientation change of the UE 301. In another step, the comparing module 321 may compare the at least one orientation parameter with the third threshold value when the current signal strength parameter value of one or more serving AAMs of the UE 301 is less than the first threshold value or when the non-serving AAM module monitor timer of the UE 301 exceeds the second threshold value.

The performing module 323 may perform measurements on one or more non-serving AAMs of the UE 301 when the at least one orientation parameter exceeds the third threshold value. In an embodiment, the performing module 323 may generate a scheduling list of the one or more non-serving AAMs of the UE 301 based on the at least one of the orientation parameter of the UE 301 and the performing module 323 may perform measurements on one or more non-serving AAMs of the UE 301 based on the generated scheduling list. The scheduling list may be a list of non-serving AAMs which may be measured. For example, if the UE has four AAMs in total (AAM1, AAM2, AAM3 and AAM4), and AAM1 is the serving AAM, then the UE may generate a scheduling list which contains AAM2 and AAM3 for measurement.

The selecting module 325 may select at least the one or more serving AAMs of the UE 301 and the one or more non-serving AAMs of the UE 301 based on the measurements performed by the performing module 323 on the one or more non-serving AAMs of the UE 301.

Figure 4:
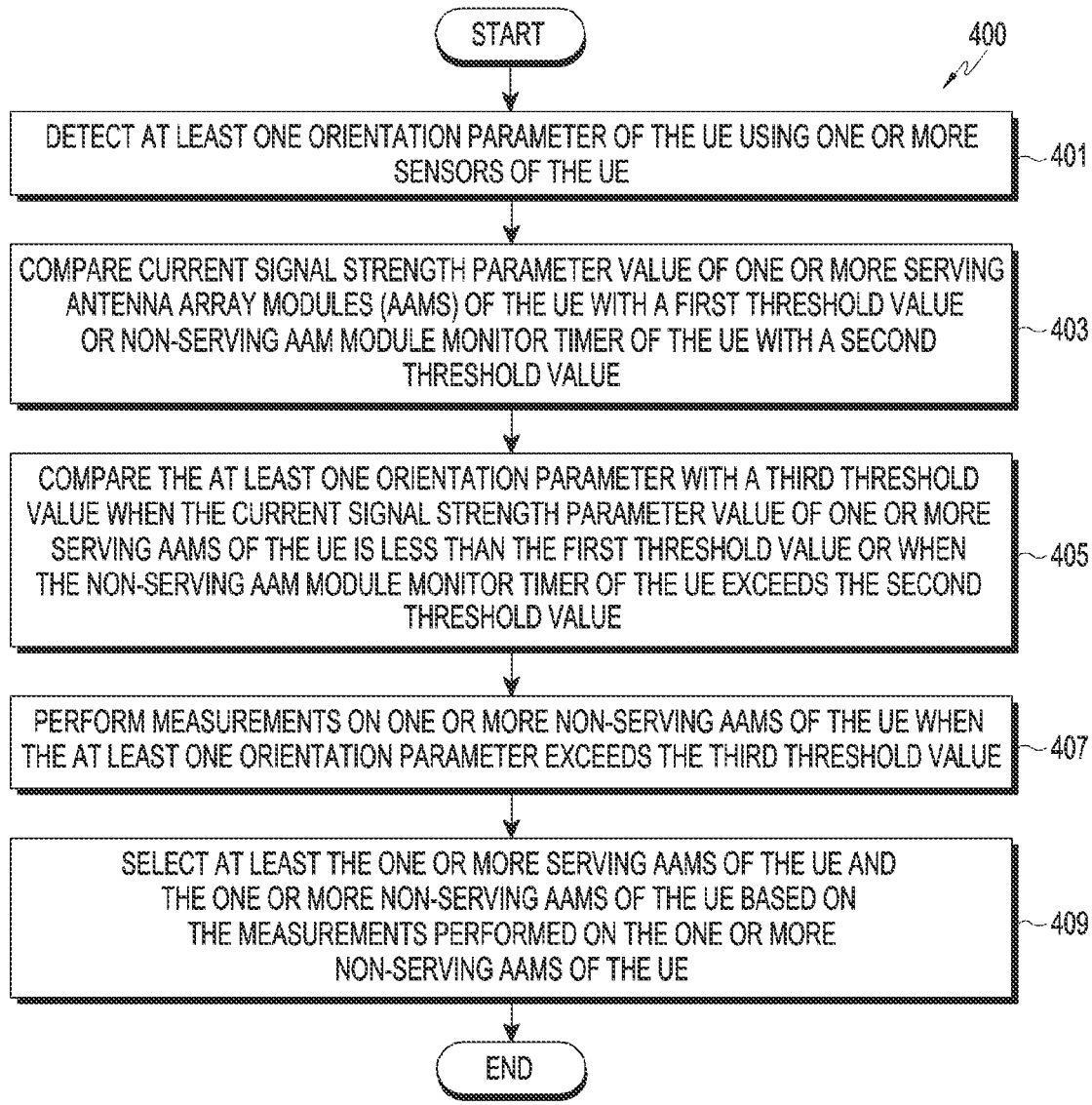
FIG. 4 is a flowchart illustrating an example method for optimal antenna array switching for a UE according to various embodiments.

FIG. 4 is a flowchart illustrating an example method for optimal antenna array switching for a UE according to various embodiments.

As illustrated in FIG. 4, the method 400 includes one or more blocks for optimal antenna array switching for a 5G NR UE (hereinafter, referred as UE). The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401, the detecting module 319 of the UE 301 may detect at least one orientation parameter of the UE using one or more sensors of the UE. The one or more sensors of the UE 301 may include, for example, and without limitation, at least one of an accelerometer, gyroscope, magnetometer, Time of Flight (ToF), grip sensor, or the like. The orientation parameter may include, for example, and without limitation, a change in orientation of the UE 301 with respect to direction of Base Station (BS) signal arrival, user activity, a metric indicating total orientation change since last check, a rate of device orientation change of the UE 301, acceleration of device orientation change of the UE 301, or the like.

At block 403, the comparing module 321 of the UE 301 may compare current signal strength parameter value of one or more serving Antenna Array Modules (AAMs) of the UE 301 with a first threshold value or non-serving AAM module monitor timer of the UE 301 with a second threshold value. The second threshold value may be a time limit of the non-serving AAM module monitor timer. The first threshold value and the second threshold value may be based on at least one of historic baseband parameters and at least one historic orientation parameter of the UE 301. The historic baseband parameters may include, for example, and without limitation, at least one of beam Reference Signal Received Power (RSRP), Doppler frequency shift and Power Delay Profile (PDP), beam gain patterns, or the like.

At block 405, the comparing module 321 of the UE 301 may compare the at least one orientation parameter with a third threshold value when the current signal strength parameter value of one or more serving AAMs of the UE 301 is less than the first threshold value or when the non-serving AAM module monitor timer of the UE 301 exceeds the second threshold value.

At block 407, the performing module 323 of the UE 301 may perform measurements on one or more non-serving AAMs of the UE 301 when the at least one orientation parameter exceeds the third threshold value.

At block 409, the selecting module 325 of the UE 301 may select at least the one or more serving AAMs of the UE 301 and the one or more non-serving AAMs of the UE 301 based on the measurements performed on the one or more non-serving AAMs of the UE 301.

Figure 5:
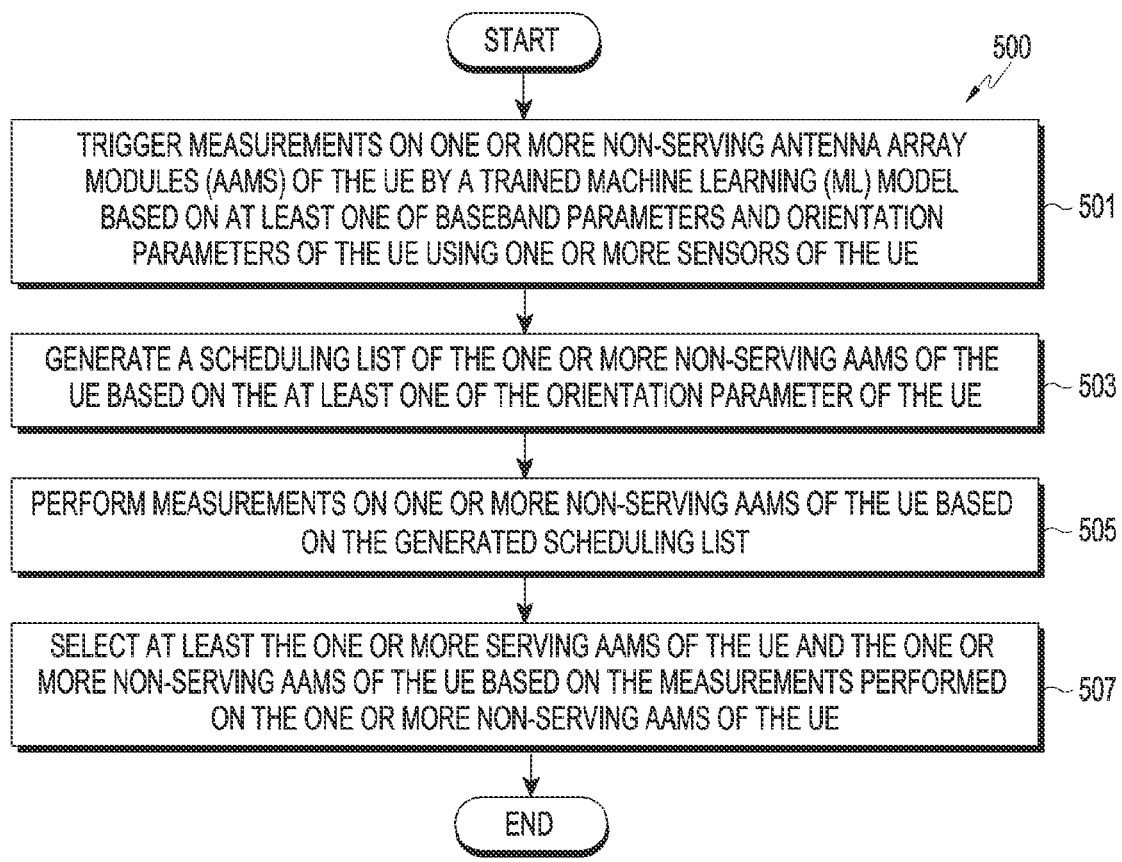
FIG. 5 is a flowchart illustrating an example method for optimal antenna array switching for a UE using ML based triggering according to various embodiments.

FIG. 5 is a flowchart illustrating an example method for optimal antenna array switching for a UE using ML based triggering according to various embodiments.

As illustrated in FIG. 5, the method 500 includes one or more blocks for optimal antenna array switching for a 5G NR UE (hereafter, referred as UE). The method 500 may be described in the general context of computer executable instructions. Generally, computer executable instructions can include routines, programs, objects, components, data structures, procedures, modules, and functions, which perform particular functions or implement particular abstract data types.

The order in which the method 500 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 501, the learning module of the UE 301 may trigger measurements on one or more non-serving Antenna Array Modules (AAMs) of the UE 301 based on at least one of baseband parameters and orientation parameters of the UE 301 using one or more sensors of the UE. The one or more sensors of the UE 301 may include, for example, and without limitation, at least one of an accelerometer, gyroscope, magnetometer, Time of Flight (ToF), grip sensor, or the like. The orientation parameter may include, for example, and without limitation, at least one of a change in orientation of the UE 301 with respect to direction of Base Station (BS) signal arrival, user activity, a metric indicating total orientation change since last check, a rate of device orientation change of the UE 301, acceleration of device orientation change of the UE 301, or the like.

At block 503, the performing module 323 of the UE 301 may generate a scheduling list of the one or more non-serving AAMs of the UE based on the at least one of the orientation parameter of the UE.

At block 505, the performing module 323 of the UE 301 may perform measurements on the one or more non-serving AAMs of the UE based on the generated scheduling list.

At block 507, the selecting module 325 of the UE 301 may select at least the one or more serving AAMs of the UE and the one or more non-serving AAMs of the UE based on the measurements performed on the triggered one or more non-serving AAMs of the UE.

Figure 6A:
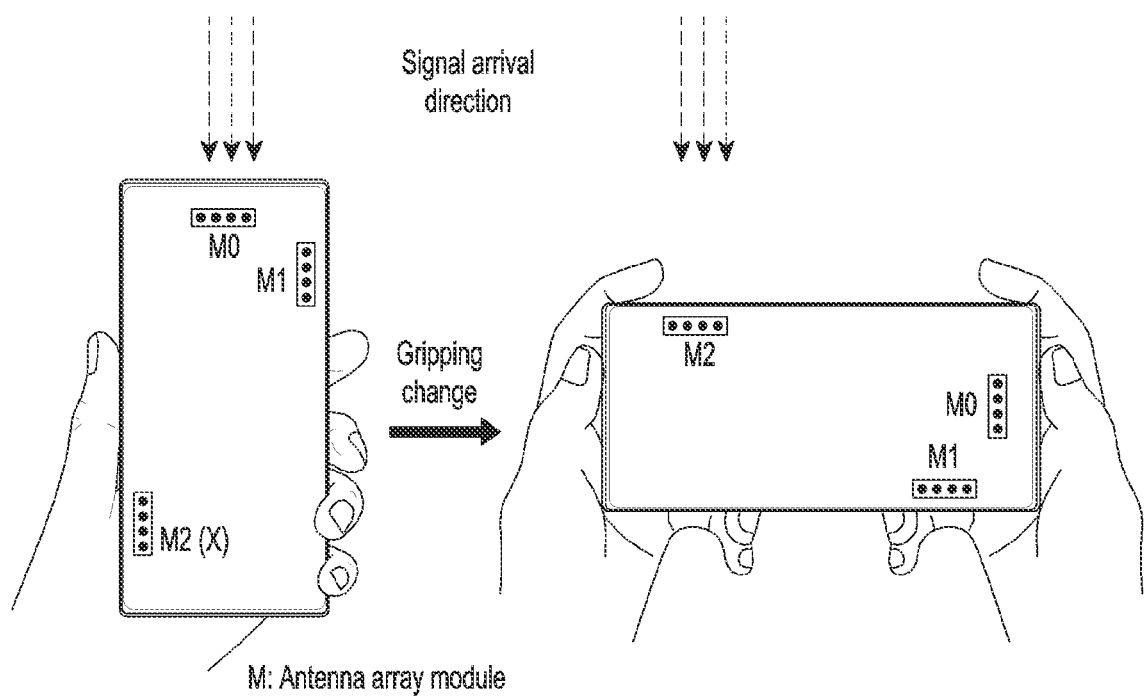
FIG. 6A illustrates an application of grip sensor usage for non-serving antenna array module monitoring for a UE grip change according to various embodiments.

FIG. 6A illustrates an application of grip sensor usage for non-serving antenna array module monitoring for a UE grip change according to various embodiments.

With reference to FIG. 6A, the antenna array module M0 may be a serving antenna array module initially, which gets blocked due to user holding the UE 301 in gaming position. Further, antenna array module M1 may, also, be blocked as shown in the FIG. 6a, due to the hand grip.

Figure 6B:
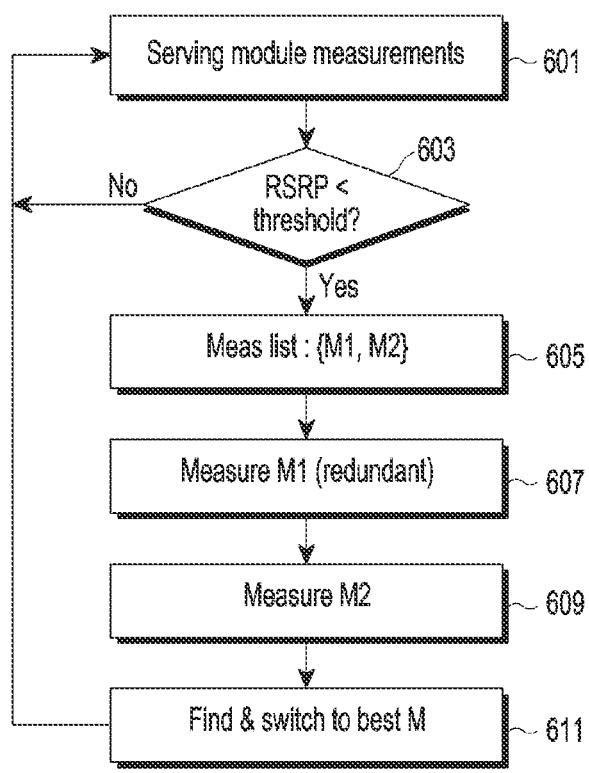
FIG. 6B is a block diagram illustrating an example of conventional approach for non-serving antenna array module monitoring.

FIG. 6B is a block diagram illustrating example of conventional approach for non-serving antenna array module monitoring.

With reference to FIG. 6B, the UE 301 may perform measurement for signal strength (RSRP) using a serving antenna array module M0 of the UE 301 at operation 601. At operation 603, the UE 301 may compare the RSRP with a specific threshold for the serving antenna array module M0. When RSRP falls below the specific threshold for the serving antenna array module M0("Yes" at operation 603), antenna array module monitoring may be triggered. The UE 301 then may measure all non-serving antenna array modules M1 and M2 at operations 605, 607 and 609, including antenna array module M1, which is blocked. Thereafter, the best antenna array module may be found and then the UE 301 may switch to the best antenna array module at operation 611.

Figure 6C:
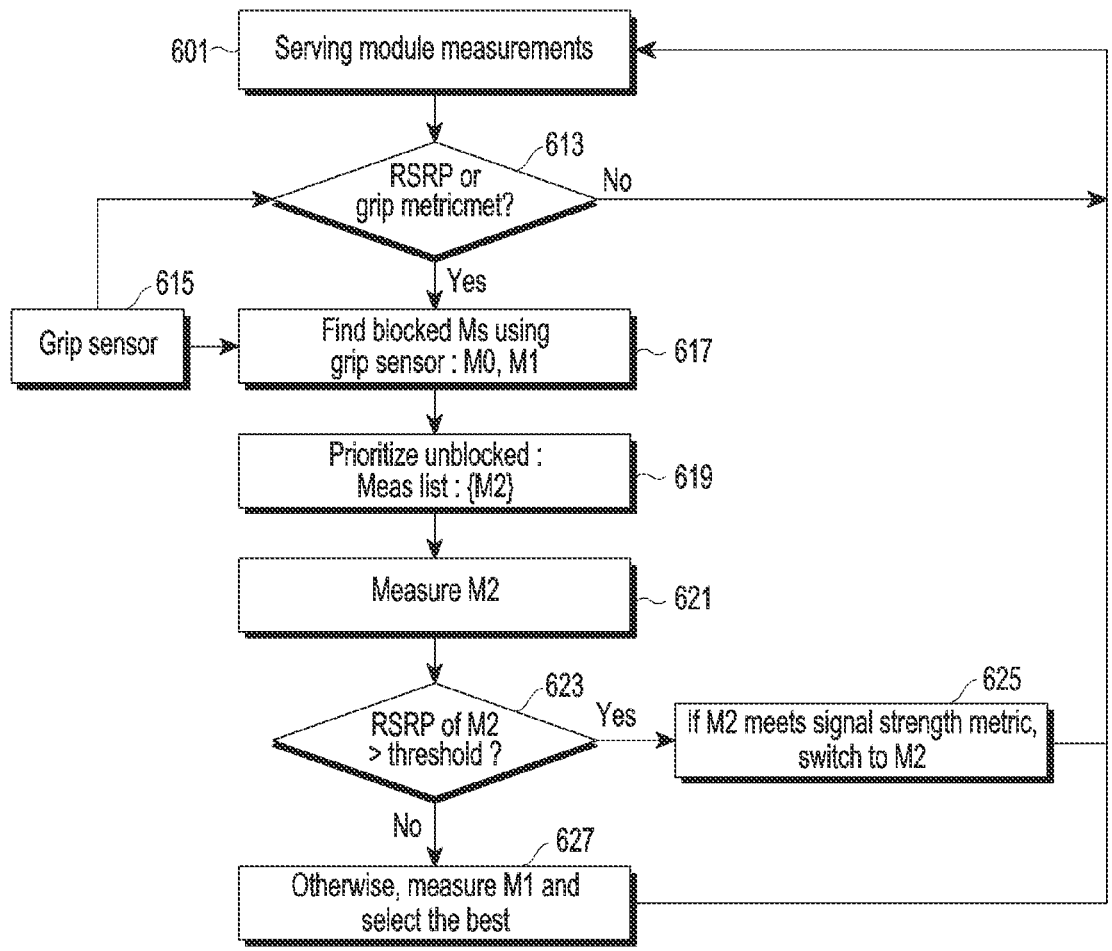
FIG. 6C is a block diagram illustrating example optimization using grip sensor according to various embodiments.

FIG. 6C is a block diagram illustrating example optimization using grip sensor according to various embodiments.

With reference to FIG. 6C, the UE 301 may perform measurement for signal strength (RSRP) using a serving antenna array module M0 of the UE 301 at operation 601. At operation 613, the UE 301 may compare the RSRP of the serving antenna array module M0 with a specific threshold for the serving antenna array module M0 and at operation 615, the UE 301 may receive input from grip sensor. When RSRP falls below the specific threshold for the serving antenna array module M0 or the input from the grip sensor indicates that the serving antenna array module M0 is blocked ("Yes" at operation 617), antenna array module monitoring may be triggered. At operation 617, the UE 301 may find blocked non-serving antenna array module between a non-serving antenna array module M1 and a non-serving antenna array module M2 based on the input from the grip sensor. Note that the non-serving antenna array module M1 is blocked. Then the measurement is prioritized for the unblocked non-serving antenna array module M2. The UE 301 may measure the non-serving antenna array module M2 at operations 619 and 621. At operation 623, the UE 301 may determine whether the non-serving antenna array module M2 meets switching criterion, for example, signal strength (RSRP) of the non-serving antenna array module M2 greater than or equal to a specific threshold for the non-serving antenna array module M2. If the non-serving antenna array module M2 meets switching criterion, for example, RSRP of the non-serving antenna array module M2 greater than or equal to a specific threshold for the non-serving antenna array module M2 ("Yes" at the operation 627), the UE 301 may select the non-serving antenna array module M2 as a new serving antenna module at operation 625. Otherwise ("No" at operation 627), the UE may measure the non-serving antenna array module M1 and switch to the best antenna array module at operation 627.

Ideal configuration profile for beam management is highly correlated with user activity. Using the sensors equipped in the UE 301, user activity such as walking, jogging and the like may be predicted quite efficiently using the learning module using sensor waveform signatures. The sensors may consider the user activity for antenna array module configuration. For example, antenna array module switching frequency is much higher while jogging than standing. Thus, ideal frequency of non-serving antenna array module measurements should be much higher for jogging than other two cases of standing or walking. Thus, measurement profiles based on user activity can yield substantial gains in performance.

Figure 6D:
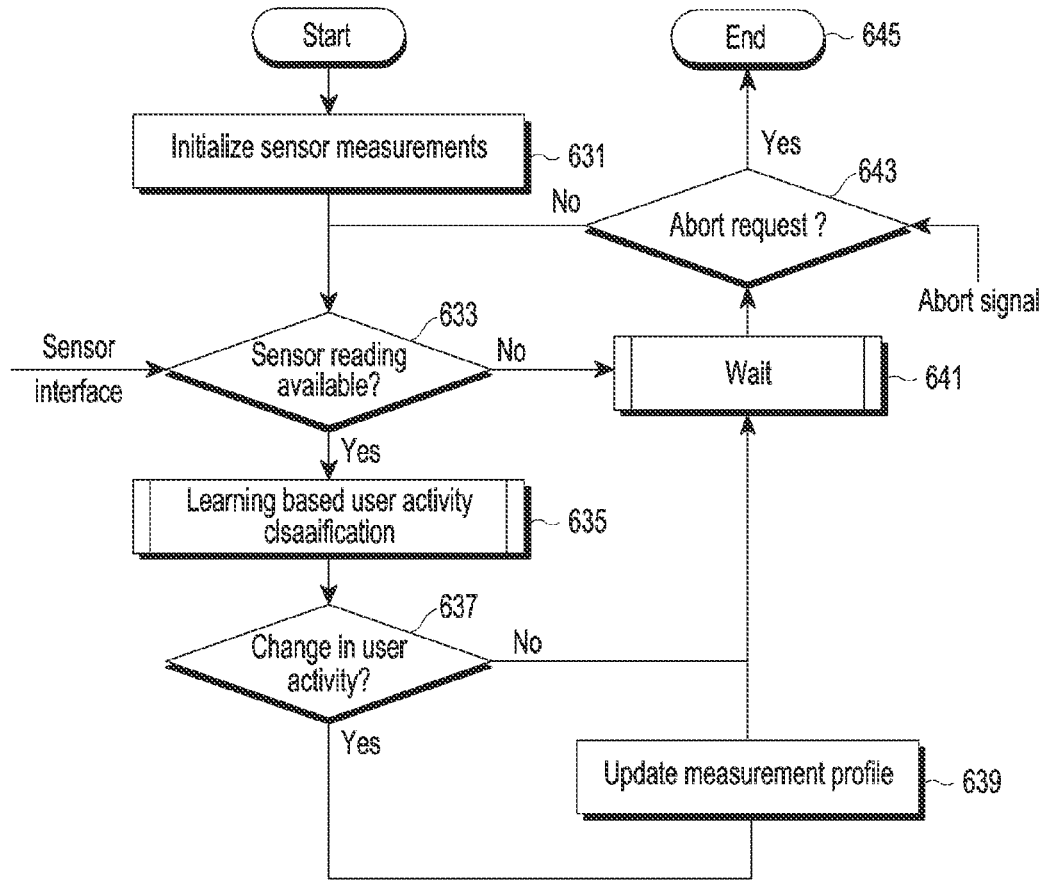
FIG. 6D is a block diagram illustrating example learning-based setup for achieving user activity detection and loading respective measurement profile according to various embodiments.

FIG. 6D is a block diagram illustrating example learning-based setup for achieving user activity detection and loading respective measurement profile according to various embodiments.

With reference to FIG. 6D, the UE 301 may perform measurement for the sensor equipped in the UE 301 at operation 631. At operation 633, the UE 301 may determine whether the sensor reading is available. If the sensor reading is available ("Yes" at operation 633), the UE 301 may perform a learning-based user activity classification. For example, a learning-based network may periodically perform user activity recognition. At operation 637, the UE 301 may determine whether the user activity is changed. Upon detection of a change in activity ("Yes" at operation 637), the UE 301 may update measurement profile at operation 639. At operation 641, the UE 301 may wait for receiving abort signal. At operation 643, the UE 301 may determine whether to receive the abort signal. If the abort signal is received ("Yes" at operation 643), the UE 301 may stop operating at operation 645. Otherwise ("No" at operation 643), the UE 301 may go back to the operation 633.

At operation 633, if the sensor reading is unavailable, the UE 301 may go to the operation 641 to wait the abort signal.

At operation 637, Upon detection of no change in activity ("No" at operation 637), the UE 301 may go to the operation 641 to wait the abort signal.

Various embodiments of the present disclosure provide optimal antenna array switching using UE orientation and signal strength parameter value/timer before triggering tracking, which minimizes the tracking overhead while simultaneously maximizing and/or improving UE responsiveness and consequently, peak throughput.

Various embodiments of the present disclosure use aspects of ML and selective scheduling of antenna arrays using data from UE sensors and signal strength parameter value/timer, which minimizes and/or reduces redundant AAM measurements, thereby, lowering power consumption of non-serving AAM.

Various embodiments of the present disclosure present a UE side implementation for optimal antenna array switching, which addresses the delays caused in the antenna array switching process due to dependency of network side transmit beam tracking optimization.

Various embodiments of the present disclosure allow saving power and increasing data rate without compromising UE responsiveness by minimizing and/or reducing redundant antenna array on time for antenna measurements and switching.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor may include, for example, and without limitation, at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media. The code implementing the described operations may further be implemented in hardware logic (e.g., an integrated circuit chip, Programmable Gate Array (PGA), Application Specific Integrated Circuit (ASIC), etc.).

The terms "an embodiment", "embodiment", "embodiments", "the embodiment", "the embodiments", "one or more embodiments", "some embodiments", and "an embodiment" may refer, for example, to "one or more (but not all) embodiments of the disclosure" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 1A, 1B, 2A, 2B, 2C, 4, 5, 6A, 6B, 6C and 6D illustrate certain events occurring in a certain order. In alternative embodiments, certain operations may be performed in a different order, modified or removed. Moreover, operations may be added to the above-described logic and still conform to the described embodiments. Further, operations described herein may occur sequentially or certain operations may be processed in parallel. Yet further, operations may be performed by a single processing unit or by distributed processing units.

Finally, the language used in the disclosure has been selected for readability and instructional purposes, and it may not have been selected to delineate or circumscribe the inventive subject matter. It is therefore intended that the scope of the disclosure not be limited by this detailed description. Accordingly, the disclosure of various example embodiments of the disclosure is intended to be illustrative, but not limiting, of the scope of the disclosure.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. A method for antenna array switching for a User Equipment (UE), the method comprising:
    detecting, by a UE, at least one orientation parameter of the UE using one or more sensors of the UE;
    comparing, by the UE, a current signal strength parameter value of one or more serving Antenna Array Modules (AAMs) of the UE with a first threshold value or comparing a non-serving AAM module monitor timer of the UE with a second threshold value;
    comparing, by the UE, the at least one orientation parameter with a third threshold value based on the current signal strength parameter value of one or more serving AAMs of the UE being less than the first threshold value or based on the non-serving AAM module monitor timer of the UE exceeding the second threshold value;
    performing, by the UE, measurements on one or more non-serving AAMs of the UE based on the at least one orientation parameter exceeding the third threshold value; and
    selecting, by the UE, at least the one or more serving AAMs of the UE and the one or more non-serving AAMs of the UE based on the measurements performed on the one or more non-serving AAMs of the UE.

2. The method of in claim 1, wherein the one or more sensors of the UE comprise an accelerometer, gyroscope, magnetometer, Time of Flight (ToF) and a grip sensor.

3. The method of claim 1, wherein the orientation parameter comprises at least one of: a change in orientation of the UE with respect to direction of base station (BS) signal arrival, user activity, a metric indicating total orientation change since last check, a rate of device orientation change of the UE and acceleration of device orientation change of the UE.

4. The method of claim 1, wherein the second threshold value comprises a time limit of the non-serving AAM module monitor timer.

5. The method of claim 1, wherein the first threshold value and the second threshold value are based on at least one of historic baseband parameters and at least one historic orientation parameter of the UE.

6. The method of claim 1, wherein at least one of the first threshold value and the second threshold value are updated before the detection of at least one orientation parameter of the UE using a trained Machine Learning (ML) model.

7. The method of claim 5, wherein the historic baseband parameters comprise at least one of: beam Reference Signal Received Power (RSRP), Doppler frequency shift and Power Delay Profile (PDP) and beam gain patterns.

8. The method of claim 1, wherein performing measurements on one or more non-serving AAMs of the UE comprises:
    generating, by the UE, a scheduling list of the one or more non-serving AAMs of the UE based on the at least one of the orientation parameter of the UE; and performing, by the UE, measurements on one or more non-serving AAMs of the UE based on the generated scheduling list,
wherein the scheduling list comprises blocked and unblocked non-serving AAMs based on a grip sensor, and
wherein the unblocked non-serving AAMs are scheduled above blocked non-serving AAMs.

9. The method of claim 1, wherein selecting at least the one or more serving AAMs of the UE and the one or more non-serving AAMs of the UE comprises:
updating, by the UE, at least one of historic baseband parameters based on the measurements on one or more non-serving AAMs of the UE; and
selecting, by the UE, the at least the one or more serving AAMs of the UE and the one or more non-serving AAMs of the UE based on the updated historic baseband parameters.

10. A User Equipment (UE) configured to perform antenna array switching in a wireless communication system, the UE comprising:
a processor; and
a memory communicatively coupled to the processor, wherein the memory stores processor-executable instructions, which on execution, cause the processor to control the UE to:
detect at least one orientation parameter of the UE using one or more sensors of the UE;
compare a current signal strength parameter value of one or more serving Antenna Array Modules (AAMs) of the UE with a first threshold value or compare a non-serving AAM monitor timer of the UE with a second threshold value;
compare the at least one orientation parameter with a third threshold value based on the current signal strength parameter value of one or more serving AAMs of the UE being less than the first threshold value or based on the non-serving AAM monitor timer of the UE exceeding the second threshold value;
perform measurements on one or more non-serving AAMs of the UE based on the at least one orientation parameter exceeding the third threshold value; and
select at least the one or more serving AAMs of the UE and the one or more non-serving AAMs of the UE based on the measurements performed on the one or more non-serving AAMs of the UE.

11. The UE of claim 10, wherein the one or more sensors of the UE comprise at least one of an accelerometer, gyroscope, magnetometer, Time of Flight (ToF) and grip sensor.

12. The UE of claim 10, wherein the orientation parameter comprises at least one of: a change in orientation of the UE with respect to direction of base station (BS) signal arrival, user activity, a metric indicating total orientation change since last check, a rate of device orientation change of the UE and acceleration of device orientation change of the UE.

13. The UE of claim 10, wherein the second threshold value comprises a time limit of the non-serving AAM module monitor timer.

14. The UE of claim 10, wherein the first threshold value and the second threshold value are based on at least one of historic baseband parameters and at least one historic orientation parameter of the UE.

15. The UE of claim 10, wherein at least one of the first threshold value and the second threshold value are updated before the detection of at least one orientation parameter of the UE using a trained Machine Learning (ML) model.

16. The UE of claim 14, wherein the historic baseband parameters comprise at least one of: beam Reference Signal Received Power (RSRP), Doppler frequency shift and Power Delay Profile (PDP) and beam gain patterns.

17. The UE of claim 10, wherein the instructions, when executed, cause the processor to control the UE to:
generate a scheduling list of the one or more non-serving AAMs of the UE based on the at least one of the orientation parameter of the UE; and
perform measurements on one or more non-serving AAMs of the UE based on the generated scheduling list,
wherein the scheduling list comprises blocked and unblocked non-serving AAMs based on a grip sensor, and
wherein the unblocked non-serving AAMs are scheduled above blocked non-serving AAMs.

18. The UE of claim 10, wherein the instructions, when executed, cause the processor to control the UE to:
update at least one of historic baseband parameters based on the measurements on one or more non-serving AAMs of the UE; and
select the at least the one or more serving AAMs of the UE and the one or more non-serving AAMs of the UE based on the updated historic baseband parameters.

19. A User Equipment (UE) configured to perform antenna array switching in a wireless communication system, the UE comprising:
a processor; and
a memory communicatively coupled to the processor, wherein the memory stores processor-executable instructions, which on execution, cause the processor to control the UE to:
trigger measurements on one or more non-serving Antenna Array Modules (AAMs) of the UE by a trained Machine Learning (ML) model based on at least one of baseband parameters and orientation parameters of the UE using one or more sensors of the UE;
generate a scheduling list of the one or more non-serving AAMs of the UE based on the at least one of the orientation parameter of the UE;
perform measurements on one or more non-serving AAMs of the UE based on the generated scheduling list; and
select at least the one or more serving AAMs of the UE and the one or more non-serving AAMs of the UE based on the measurements performed on the one or more non-serving AAMs of the UE.

20. The UE of claim 19, wherein the baseband parameters comprise at least one of: beam Reference Signal Received Power (RSRP), Doppler frequency shift and Power Delay Profile (PDP) and beam gain patterns.

* * * * *